United States Patent [19]
Lohr

[11] 4,066,273
[45] Jan. 3, 1978

[54] TOY CAR

[76] Inventor: Raymond J. Lohr, 5043 Sterrettania, Erie, Pa. 16506

[21] Appl. No.: 694,249

[22] Filed: June 9, 1976

[51] Int. Cl.² .............................................. B62M 1/14
[52] U.S. Cl. ................................ 280/211; 280/242 R; 280/249
[58] Field of Search ................... 280/211, 240, 242 R, 280/242 WC, 249

[56]  References Cited
U.S. PATENT DOCUMENTS

| 2,795,422 | 6/1957 | Bartlett | 280/211 X |
| 3,052,486 | 9/1962 | Malmquist | 280/211 |
| 3,450,416 | 6/1969 | Mulder | 280/211 |
| 3,891,234 | 6/1975 | Auer et al. | 280/211 |
| 3,917,312 | 11/1975 | Rodaway | 280/242 WC |

FOREIGN PATENT DOCUMENTS

| 461,732 | 6/1928 | Germany | 280/249 |

Primary Examiner—Joseph F. Peters, Jr.
Assistant Examiner—Donn McGiehan
Attorney, Agent, or Firm—Charles L. Lovercheck

[57]  ABSTRACT

A toy car adapted to caper about, having a seat, a backrest and large wheels with inwardly-extending handles supported on the wheel rims. The wheels are supported on the ends of arms which are supported just to the rear of the seat and the ground-engaging bumper attached to the front of the vehicle supports the front of the car when it is occupied and tips forward.

15 Claims, 4 Drawing Figures

TOY CAR

REFERENCE TO PRIOR ART

A car of the general type disclosed herein is shown in the 1974 catalogue of Marx Toy Company, Inc. at page 16. The toy disclosed herein is simpler in design and reduces tool cost, packing cost and size.

OBJECTS OF THE INVENTION

It is an object of the invention to provide an improved toy vehicle which is more economical to manufacture, simple to assemble, and easier to pack for shipment than earlier models known to the art.

Another object of the invention is to provide a toy vehicle that is simple in construction, economical to manufacture and simple and efficient to use.

Another object of the invention is to provide an improved toy wherein the user can easily and safely enter and leave the car.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

DETAILED DESCRIPTION OF DRAWINGS

Figure 1:
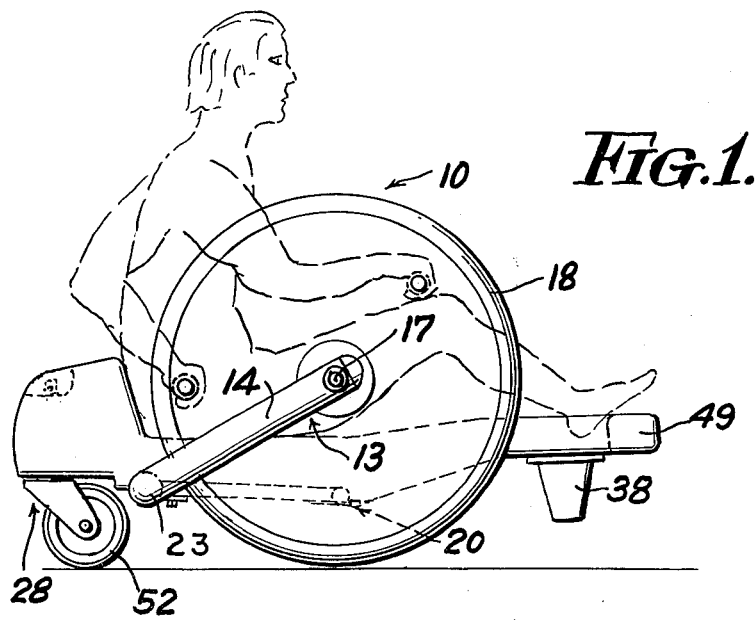
FIG. 1 is a side view of the vehicle according to the invention.
Figure 2:
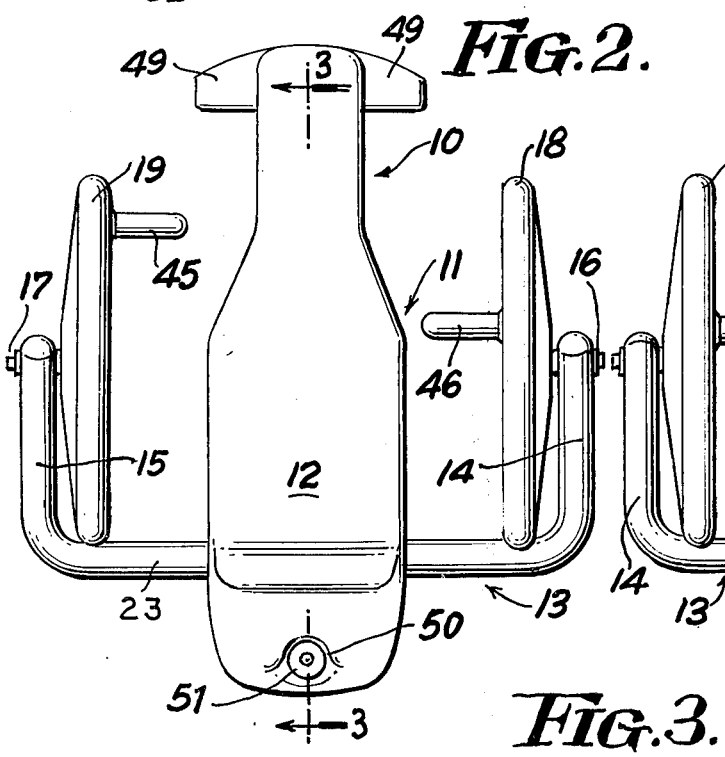
FIG. 2 is a top view of the vehicle shown in FIG. 1.
Figure 4:
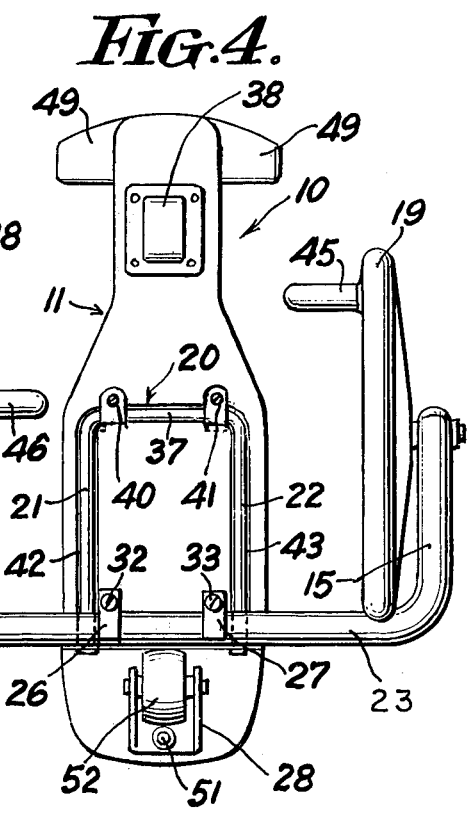
FIG. 4 is a bottom view of the vehicle.
Figure 3:
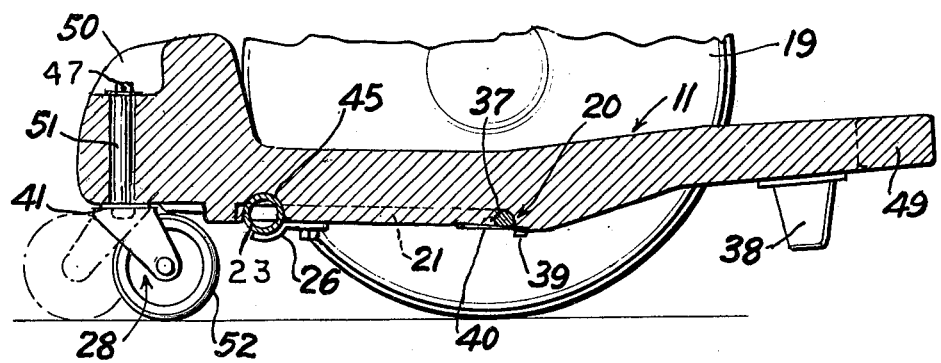
FIG. 3 is a longitudinal, cross-sectional view of the vehicle taken on line 3—3 of FIG. 2.

Now, with more particular reference to the drawing, the toy vehicle indicated generally at 10 has a one-piece body 11 made up of a seat 12, a backrest and a footrest 49 and a front bumper 38. The bottom of the body is grooved to receive the intermediate part of the U-shaped frame 13 and a U-shaped wire 20 and clips 40 and 41 hold the wire in the groove and clips 26 and 27 hold intermediate part 23 of the frame in slot 45 and from relative rotation.

The body 11 is supported on wheels 18 and 19 by the U-shaped frame 13 and by a caster wheel 52 of caster 28. The U-shaped frame 13 has upwardly and forwardly-extending legs 14 and 15 with inwardly-extending axles 16 and 17 received in holes in the front ends of the legs 14 and 15 of the U-shaped frame 13. The wheel-supporting axles 16 and 17 are held in place on the U-shaped frame by suitable fasteners.

The U-shaped frame 13 is supported on the body 11 by the U-shaped wire 20. U-shaped wire 20 has an intermediate part 37 and legs 21 and 22 which extend through holes in the intermediate member 23 of the frame 13. Intermediate part or member 23 of the frame is received in slot 39 in the bottom of the body and is held in place by clips 26 and 27 which overlie the frame part or member 23 and are held in place by screws 32 and 33 which extend through holes in the clips and engaging the bottom of the body.

Clips 26 and 27 have a flat part that rests on the bottom of body 11 and a curved part that overlies the intermediate part of the frame 13 as shown. Clips 40 and 41 overlie an intermediate part 37 of the wire 20 and hold it in grooves 42 and 43.

The caster 28 has a stem 51 extending through a hole in the body and is held in place by a pin 47 in its upper end. Bearing 41 on the caster frame allows the caster to swing freely with its caster wheel 52 engaging the ground.

When a person sits on the seat 12 with his back against the backrest and his feet on footrests 49, the caster wheel 28 comes down into engagement with the floor and the occupant can grasp handles 45 and 46 attached to the inside of wheels 18 and 19. He can rotate wheels 18 and 19 individually or together in either direction, causing the vehicle to go forward, rearward, or to turn, thus steering as well as propelling the vehicle in various paths and patterns. Should the person's weight shift forward, the ground engaging support such as a bumper 38 on the front of the body may tilt down, causing it to engage the ground.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A toy vehicle comprising,
   an elongated body having a seat and a back rest thereon,
   a generally U-shaped frame having two upwardly and forwardly extending spaced legs each terminating in a front distal end an intermediate member fixed to said legs remote from said distal end,
   means connecting said intermediate member to said body securing said intermediate member to said body against rotation relative thereto,
   said legs extending from said intermediate member in cantilever fashion,
   an axle on the front end of each said leg,
   said spaced legs each being spaced outwardly from said body providing a space in which an occupant may move his legs,
   a wheel rotatably affixed on each said axle between a said leg and said body,
   means fixing said intermediate member to said body,
   said wheels each having means adapted to be engaged by a hand of the occupant whereby said vehicle can be propelled forwardly, rearwardly or in a curved path.

2. The toy vehicle recited in claim 1 wherein said body has a transverse slot therein receiving said intermediate member.

3. The vehicle recited in claim 1 wherein said means fixing said intermediate member to said body comprises second spaced legs engaging said intermediate member, holding said intermediate member in place relative to said frame.

4. The vehicle recited in claim 3 wherein a groove in said body receives a U-shaped wire.

5. The vehicle recited in claim 1 wherein said vehicle body has a rear ground-engaging means supported at the rear end thereof, rearwardly of said seat and rearwardly spaced from said intermediate part of said frame.

6. The vehicle recited in claim 5 wherein a second ground-engaging means is supported on the front end of said body, spaced from said intermediate member.

7. The vehicle recited in claim 6 wherein said rear ground-engaging means is a caster wheel.

8. The vehicle recited in claim 6 wherein second ground-engaging means comprising a downwardly extending support is fixed to said body at the side of said frame remote from said rear ground-engaging means.

9. The vehicle recited in claim 4 wherein said means attaching the distal ends of said U-shaped wire to said intermediate part of said U-shaped frame comprises holes in said intermediate part of said frame, freely receiving said ends of said wire.

10. The vehicle recited in claim 1 wherein said means supporting said intermediate part of said wire on said body comprises clip members,
said clip members overlying the intermediate part of said wire.

11. The vehicle recited in claim 10 wherein said means supporting said intermediate part of said U-shaped frame comprise clips overlying said intermediate part of said frame and attached to said body wire.

12. The vehicle recited in claim 1 wherein said frame member is made of tubular material.

13. The vehicle recited in claim 1 wherein said wheels each have an inwardly-extending handle attached near the rims thereof on the side adjacent the seat.

14. The vehicle recited in claim 1 wherein said body has a footrest thereon.

15. A toy vehicle comprising,
a body having a seat and a backrest thereon,
a generally U-shaped frame having two upwardly and forwardly extending legs and an intermediate member,
inwardly-extending axles attached to said legs at the ends thereof, remote from said intermediate member,
a wheel on each said axle,
a U-shaped wire having two spaced legs and an intermediate member received in a groove in said body,
a slot in said body receiving said intermediate member of said U-shaped frame,
the legs of said U-shaped wire extending through holes in said U-shaped frame and clips fixed to said body overlying said intermediate member of said frame and said intermediate part of said wire, holding said wire and said intermediate member of said frame in said groove and said slot respectively,
a caster wheel on said body rearward of said intermediate member,
a footrest on said body on the end thereof spaced from said caster wheel, and
a bumper on said body adjacent said footrest for engaging the ground.

* * * * *